(12) United States Patent
Niitsuma

(10) Patent No.: US 10,271,530 B2
(45) Date of Patent: Apr. 30, 2019

(54) DUAL-BEARING REEL

(71) Applicant: Shimano Inc., Sakai, Osaka (JP)

(72) Inventor: Akira Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 220 days.

(21) Appl. No.: 15/374,721

(22) Filed: Dec. 9, 2016

(65) Prior Publication Data

US 2017/0202192 A1    Jul. 20, 2017

(30) Foreign Application Priority Data

Jan. 19, 2016 (JP) ................................ 2016-008320

(51) Int. Cl.
*A01K 89/01* (2006.01)
*A01K 89/017* (2006.01)

(52) U.S. Cl.
CPC ................ *A01K 89/0173* (2015.05)

(58) Field of Classification Search
CPC .............. A01K 89/017; A01K 89/0173; A01K 89/0183; A01K 89/01931; A01K 89/01555
See application file for complete search history.

(56) References Cited

U.S. PATENT DOCUMENTS

| | | | | |
|---|---|---|---|---|
| 4,790,492 A * | 12/1988 | Atobe | ............. | A01K 89/01931 242/223 |
| 6,045,076 A * | 4/2000 | Daniels | ............ | A01K 89/01555 188/268 |
| 6,412,722 B1 * | 7/2002 | Kreuser | ........... | A01K 89/01555 242/288 |
| 2004/0148843 A1 * | 8/2004 | Ikuta | ................ | A01K 89/01555 43/21 |
| 2004/0227029 A1 * | 11/2004 | Ikuta | ................ | A01K 89/01555 242/288 |
| 2005/0218255 A1 * | 10/2005 | Ikuta | ................ | A01K 89/01555 242/288 |
| 2010/0006686 A1 * | 1/2010 | Yusa | ................ | A01K 89/01555 242/227 |
| 2010/0133371 A1 * | 6/2010 | Chang | ................ | A01K 89/0183 242/229 |
| 2011/0259988 A1 * | 10/2011 | Strohecker | ........... | A01K 97/125 242/285 |

(Continued)

FOREIGN PATENT DOCUMENTS

JP    2004357601 A    12/2014

*Primary Examiner* — Emmanuel M Marcelo
(74) *Attorney, Agent, or Firm* — United IP Counselors, LLC

(57) ABSTRACT

A dual-bearing reel comprises a reel unit, a spool, a rotation detector, a moving member, a spool actuator, a cooperative actuating mechanism, and a spool controller. The spool is for winding the fishing line, and is rotatably mounted to the reel unit. The rotation detector detects a rotational position about an axis. The moving member is rotatable about the axis, and the rotational position is a position of the moving member. The spool actuator is electrically controllable and performs an action with respect to the spool. An operating member is movably mounted to the reel unit, and adjusts a state of the spool actuator. The cooperative actuating mechanism rotates the moving member in accordance with a movement of the operating member. The spool controller controls the spool actuator based on the rotational position.

19 Claims, 12 Drawing Sheets

(56) References Cited

U.S. PATENT DOCUMENTS

2013/0306777 A1\* 11/2013 Ikebukuro ........ A01K 89/01555
 242/288
2014/0110517 A1\* 4/2014 Niitsuma ......... A01K 89/01555
 242/288

\* cited by examiner

DUAL-BEARING REEL

CROSS-REFERENCE TO RELATED APPLICATIONS

This application claims priority to Japanese Patent Application No. 2016-008320 filed on Jan. 19, 2016, the entirety of which is hereby incorporated by reference in its entirety.

BACKGROUND

Technical Field

The present disclosure relates to a fishing reel, and particularly to a dual-bearing reel that forwardly releases a fishing line.

Background Information

In dual-bearing reels, a spool for winding a fishing line is rotatably installed in a reel unit. There is a type of dual-bearing reel including a spool actuating mechanism that performs an action with respect to a spool (see e.g., Japan Laid-open Patent Application Publication No. 2004-357601). Japan Laid-open Patent Application Publication No. 2004-357601 describes a dual-bearing reel including a spool brake as the spool actuating mechanism. In casting, the spool brake brakes a fishing-line releasing directional rotation of the spool in an electrically controllable manner. The dual-bearing reel described in Japan Laid-open Patent Application Publication No. 2004-357601 is provided with a circuit board. A microcomputer for control purposes, and a detector for detecting a moving direction of an operating member, are mounted to the circuit board.

The size of the spool actuating mechanism (e.g., the spool brake) possibly depends on the sizes of reels. In well-known dual-bearing reels, the position and the size of the operating member are changed in accordance with the sizes of the reels, and the position of the detector on the circuit board is also changed. Therefore, it is required to use a plurality of types of circuit boards in accordance with the sizes of the reels.

BRIEF SUMMARY

It is an object of the present disclosure to enable a single type of circuit board to be used among dual-bearing reels, each of which includes an electrically controllable spool actuating mechanism, regardless of the sizes of the dual-bearing reels.

A dual-bearing reel according to the present disclosure forwardly releases a fishing line. The dual-bearing reel includes a reel unit, a spool for winding the fishing line, a circuit board, at least one moving member, a spool actuating mechanism, at least one operating member, a cooperative actuating mechanism and a spool controller. The spool for winding the fishing line is rotatably mounted to the reel unit. The circuit board includes at least one rotation detector. The at least one rotation detector is capable of detecting a rotational position about a first axis. The at least one moving member is a member that the rotational position thereof is detected by the at least one rotation detector. The spool actuating mechanism performs an action with respect to the spool in an electrically controllable manner, and a state of the action is adjusted by the at least one moving member. The at least one operating member is movably mounted to the reel unit, and performs an operation of adjusting the state of the action of the spool actuating mechanism. The cooperative actuating mechanism rotates the at least one moving member in accordance with a movement of the at least one operating member. The spool controller controls the spool actuating mechanism in accordance with the rotational position of the at least one moving member.

In the dual-bearing reel, when the at least one operating member is operated and moved, the cooperative actuating mechanism rotates the at least one moving member about the first axis in conjunction with the at least one operating member. When the at least one moving member is rotated, the at least one rotation detector detects the rotational position of the at least one moving member. Then, the spool controller controls the spool actuating mechanism in accordance with the rotational position of the at least one moving member. In the dual-bearing reel, the at least one moving member, the rotational position of which is detected by the at least one rotation detector, is indirectly coupled to the at least one operating member through the cooperative actuating mechanism without being directly coupled to the at least one operating member. Hence, the at least one moving member, the at least one rotation detector and the circuit board are commonly usable among dual-bearing reels with different sizes. In other words, a single type of circuit board is usable with various dual-bearing reels regardless of their sizes.

The at least one operating member can be rotatable about a second axis arranged in parallel to the first axis while mounted to the reel unit. According to this construction, the operating member can rotate. Hence, the cooperative actuating mechanism can be simply constructed.

The cooperative actuating mechanism can include a cam mechanism. The cam mechanism rotates the at least one moving member in conjunction with the movement of the at least one operating member. According to this construction, the cooperative actuating mechanism can be implemented by the cam mechanism composed of a cam and a cam follower. Hence, the cooperative actuating mechanism can be more simply constructed.

The at least one moving member can be disposed to overlap with the at least one operating member in an axial direction. According to this construction, the at least one moving member and the at least one operating member are disposed overlapping with each other in an axial direction. Hence, the dual-bearing reel can be constructed in a compact size in the radial direction.

The spool actuating mechanism can be a spool brake. The spool brake brakes the spool, and includes a coil and a magnet. The coil is mounted to the circuit board. The magnet is mounted to the spool so as to be unitarily rotatable with the spool. The at least one moving member can be mounted to the circuit board so as to be rotatable about the first axis. The at least one operating member can be mounted to the reel unit so as to be rotatable about the second axis. The spool brake brakes the spool by controlling electric current flowing through the coil. According to this construction, among dual-bearing reels, each of which includes the spool brake, a single type of circuit board is usable for the spool brakes, regardless of the sizes of the dual-bearing reels.

The spool actuating mechanism can be a spool driver. The spool driver includes a motor fixed to the reel unit, and drives the motor to rotate the spool. The at least one operating member can be rotatable about the second axis while mounted to the reel unit. The spool driver drives the motor to rotate the spool. According to this construction, among dual-bearing reels, each of which includes the spool driver, a single type of circuit board is usable for the spool drivers, regardless of the sizes of the dual-bearing reels.

The cam mechanism can include a cam and a cam follower. The cam is mounted to one of the at least one moving member and the at least one operating member. The cam follower is mounted to the other of the at least one moving member and the at least one operating member, and is engaged with the cam. According to this construction, the cooperative actuating mechanism can be simply constructed by the cam mechanism.

The cam can include a cam groove provided on the at least one operating member in a radial direction. The cam follower can include a protrusion. The protrusion is disposed parallel to and away from the first axis, and protrudes from a surface on the at least one moving member. The protrusion can contact a wall surface of the cam groove. According to this construction, a rotation of the at least one operating member about the second axis can be easily transmitted to a rotation of the at least one moving member about the first axis by the engagement of the protrusion with the cam groove.

The dual-bearing reel can further include a positioning mechanism. The positioning mechanism can set the at least one operating member in any of a plurality of moving positions, each moving position corresponding to one of a plurality of levels. According to this construction, the at least one operating member can be set in any of the moving positions corresponding to the levels. Therefore, the state of the action of the spool actuating mechanism can be easily reproduced.

Overall, according to the present disclosure, a single type of circuit board is usable with a plurality of dual-bearing reels regardless of a size of the dual-bearing reel, each dual bearing reel including an electrically controllable spool actuating mechanism.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
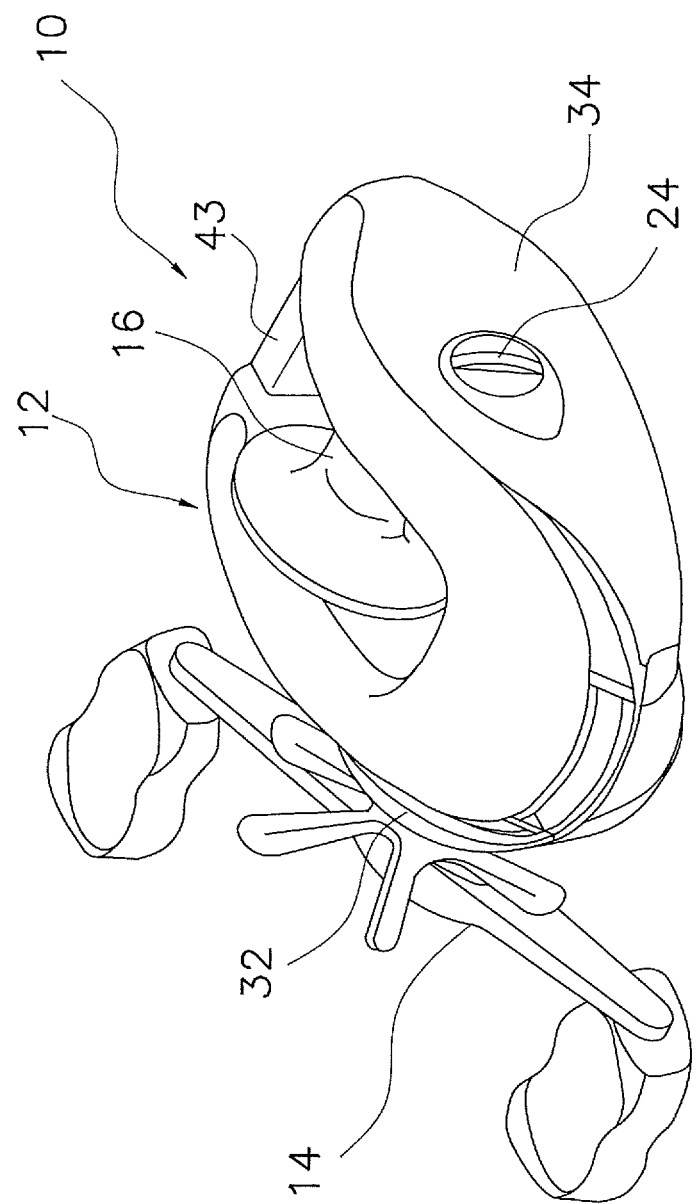
FIG. 1 is a perspective view of a dual-bearing reel according to a first preferred embodiment of the present disclosure.
Figure 2:
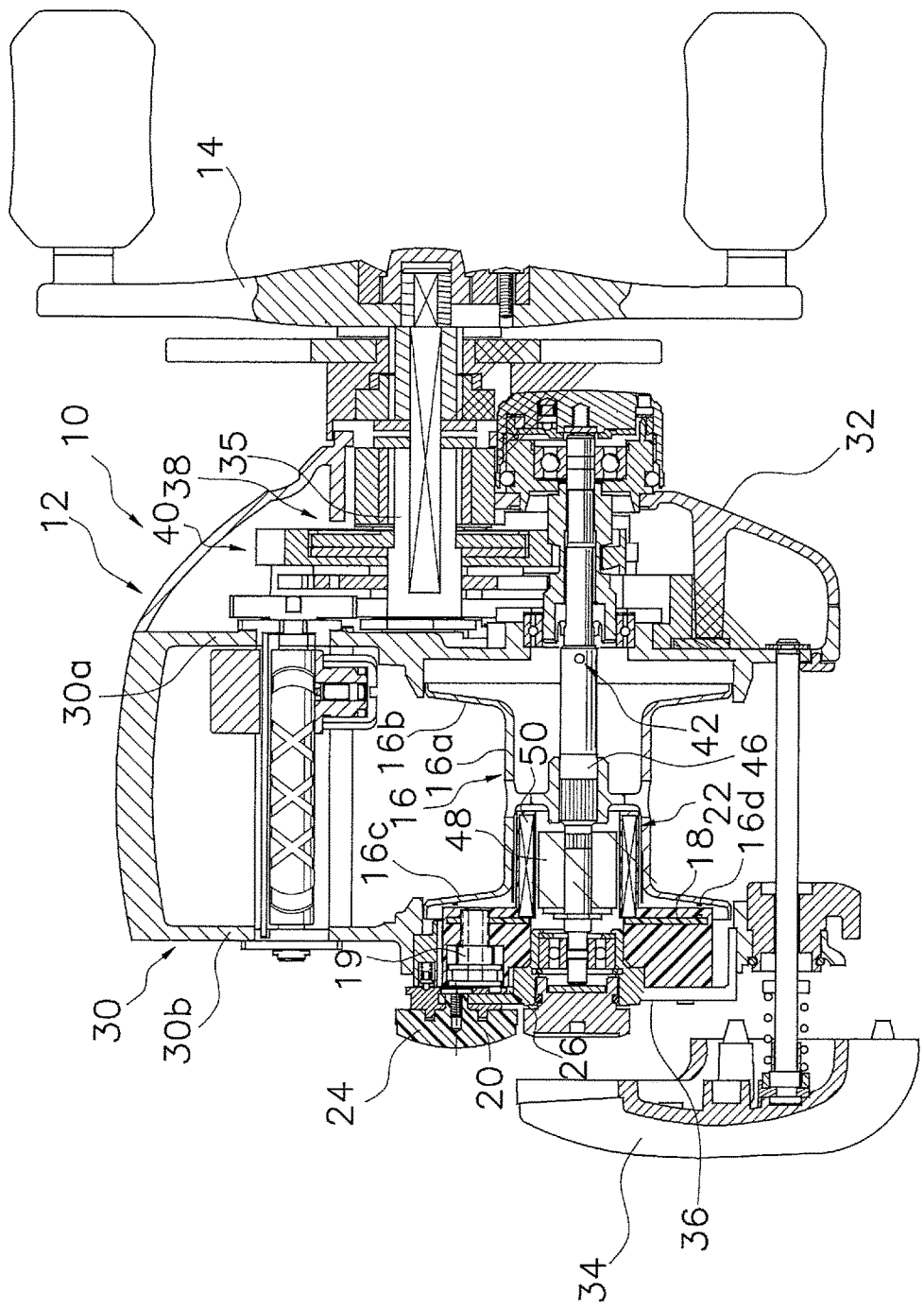
FIG. 2 is a cross-sectional plan view of the dual-bearing reel.

As shown in FIGS. 1 and 2, a dual-bearing reel 10 according to a first preferred embodiment of the present disclosure forwardly releases a fishing line. The dual-bearing reel 10 includes a reel unit 12, a handle 14, a spool 16 for winding the fishing line, a circuit board 18 including a rotation detector 19, at least one moving member 20 (see FIG. 2), a spool brake 22 provided as a spool actuating mechanism (spool actuator), at least one operating member 24, a cooperative actuating mechanism 26, a spool controller 28 (see FIG. 3) and a positioning mechanism 29.

Figure 5:
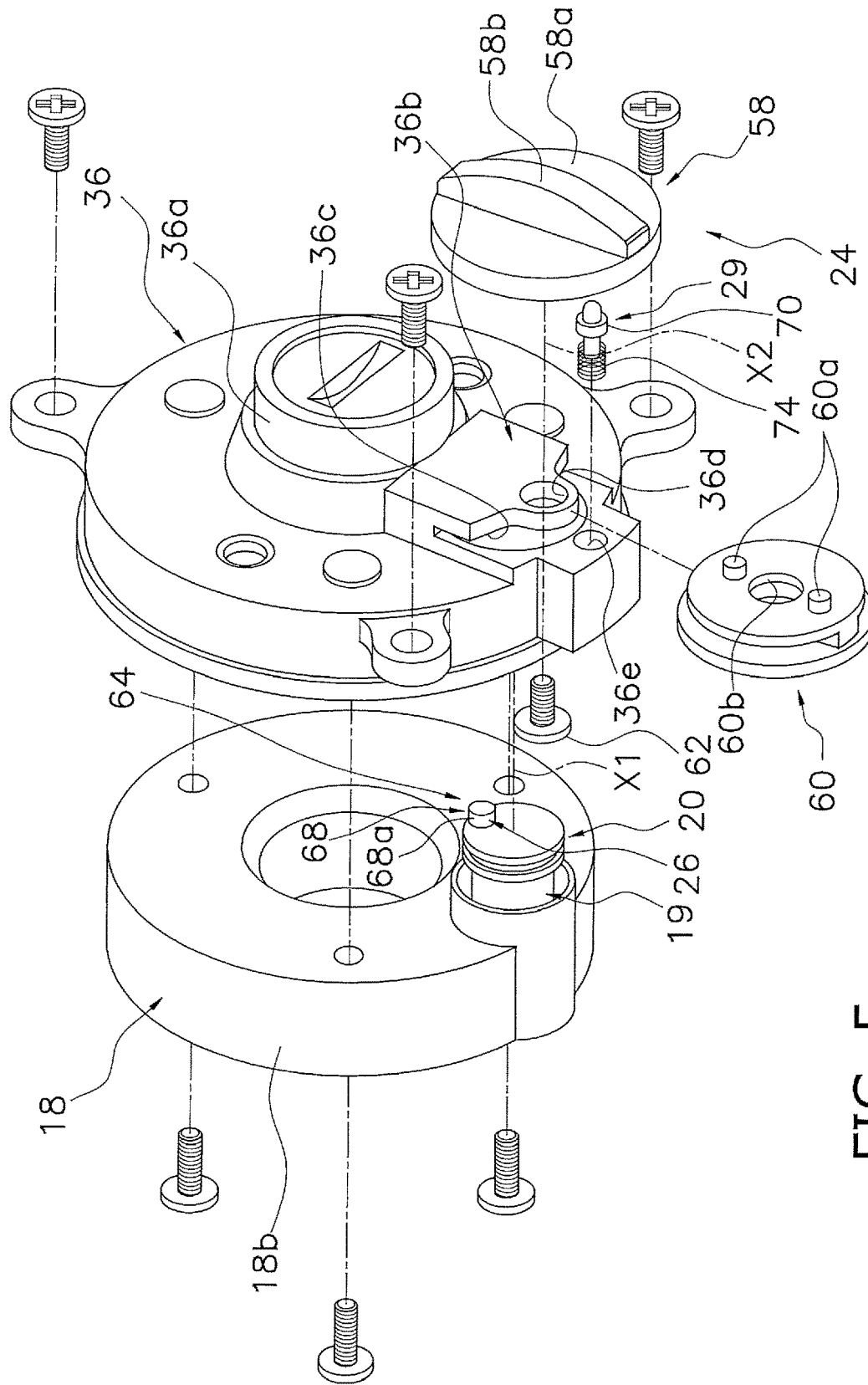
FIG. 5 is an exploded perspective view of a construction of a circuit board and the cooperative actuating mechanism.

As shown in FIG. 2, the reel unit 12 includes a frame 30, a first side cover 32, a second side cover 34 and a shaft support portion 36. The frame 30 includes a first side plate 30a and a second side plate 30b. The first side plate 30a is disposed opposing the second side plate 30b, and is disposed at an interval away from the second side plate 30b. The first side cover 32 covers the outer lateral surface of the first side plate 30a on the handle 14 side. The second side cover 34 covers the outside of the second side plate 30b. The second side cover 34 is capable of taking a closed position and an opened position. The shaft support portion 36 supports the spool 16 such that the spool 16 is rotatable. The shaft support portion 36 has a flat cylindrical shape having a partially closed end. The shaft support portion 36 is detachably fixed to the second side plate 30b by at least one screw. The shaft support portion 36 includes a bearing accommodation part 36a and a cooperative actuating mechanism mount part 36b. The bearing accommodation part 36a has a tubular shape and accommodates a bearing 47a for supporting one end of a spool shaft 46 to be described in further detail below. The cooperative actuating mechanism mount part 36b is a part to which the cooperative actuating mechanism 26 is mounted. As shown in FIG. 5, the cooperative actuating mechanism mount part 36b includes a mount groove 36c, a support hole 36d and an accommodation hole 36e. The mount groove 36c is a part to which the cooperative actuating mechanism 26 is mounted. The support hole 36d supports the operating member 24 such that the operating member 24 is rotatable. The accommodation hole 36e accommodates the positioning mechanism 29.

As shown in FIGS. 1 and 2, the handle 14 is rotatably disposed on the first side plate 30a side of the reel unit 12. The handle 14 is coupled to a drive shaft 35 rotatably supported by the reel unit 12, while being unitarily rotatable therewith. The handle 14 is prevented from rotating in a fishing line releasing direction. The handle 14 is allowed to rotate in a fishing line winding direction and the rotation is transmitted to the spool 16 through a plurality of mechanisms including a drag mechanism 38, a rotation transmission mechanism 40 and a clutch mechanism 42. The rotation transmission mechanism 40 includes the drive shaft 35. The rotation transmission mechanism 40 transmits rotation of the handle 14 to the spool 16. The clutch mechanism 42 is switchable between a clutch-on state and a clutch-off state. When set in the clutch-on state, the clutch mechanism 42 allows a transmission of the rotation of the handle 14 to the spool 16. On the other hand, when set in the clutch-off state, the clutch mechanism 42 prevents a transmission of the rotation of the handle 14 to the spool 16. The clutch mechanism 42 is switched between the clutch-on state and the clutch-off state by a clutch operating member 43. The clutch operating member 43 is movably mounted to the rear part of the reel unit 12.

As shown in FIG. 2, the spool 16 for winding the fishing line is rotatably mounted to the reel unit 12. The spool 16 includes a bobbin trunk 16a, a first flange 16b and a second flange 16c. The first flange 16b has a large diameter part integrally formed with the bobbin trunk 16a and is located on the first side plate 30a side of the bobbin trunk 16a. The second flange part 16c is a large diameter part integrally formed with the bobbin trunk 16a and is located on the second side plate 30b side of the bobbin trunk 16a. At least one detection target 16d is mounted to the outer lateral surface of the second flange 16c. The detection target 16d is detected by a spool sensor 21 (to be described) provided for detecting rotation of the spool 16. The detection target 16d is, for instance, a magnet. The spool 16 is coupled to the spool shaft 46 penetrating its center while being unitarily rotatable therewith. The spool shaft 46 is coupled to or decoupled from the rotation transmission mechanism 40 by the clutch mechanism 42.

Figure 4:
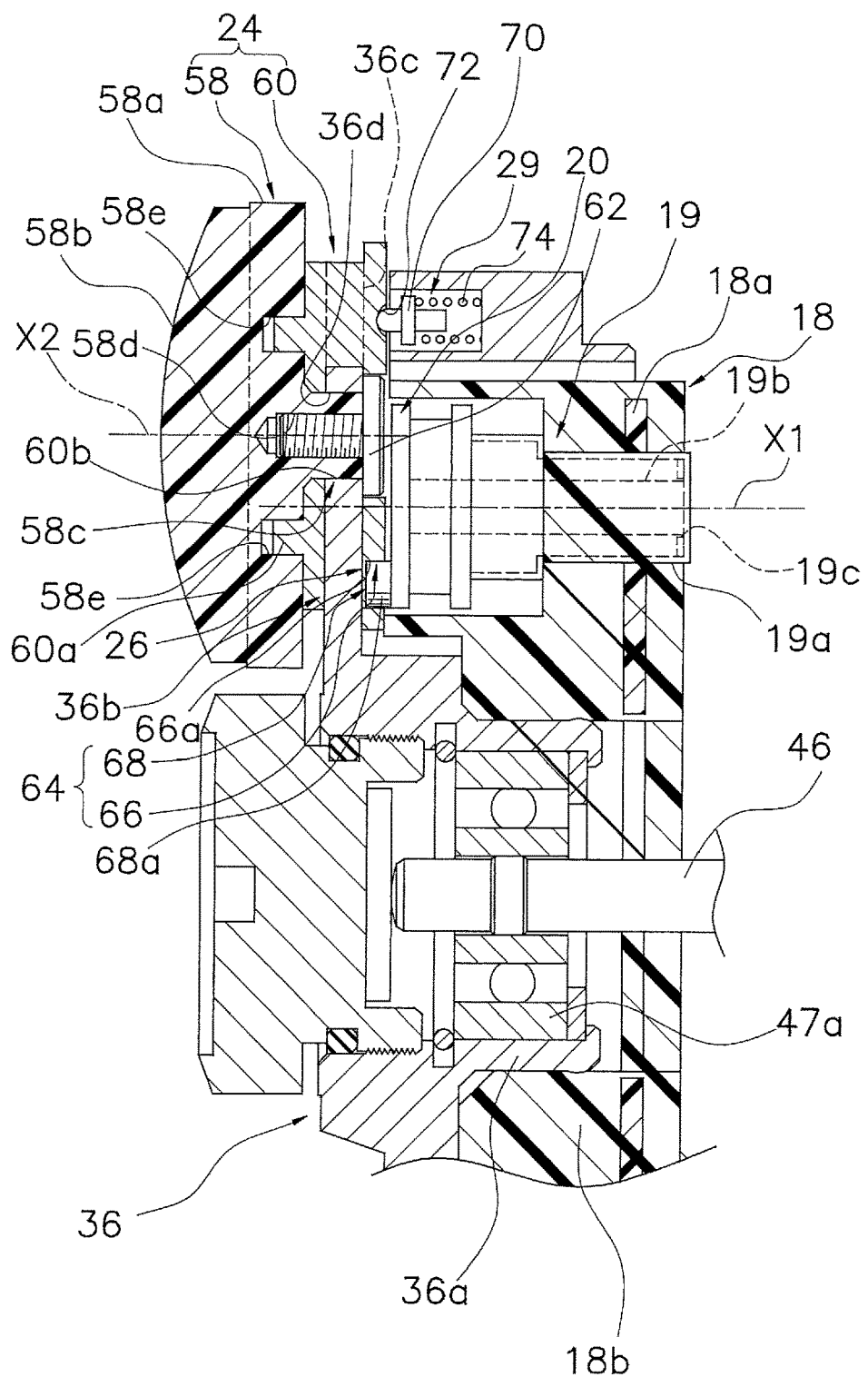
FIG. 4 is an enlarged cross-sectional view of an operating member and a cooperative actuating mechanism.

As shown in FIGS. 4 and 5, the circuit board 18 includes at least one rotation detector 19. The rotation detector 19 is capable of detecting a rotational position about a first axis X1. The circuit board 18 includes a board part 18a and a coating part 18b. The board part 18a is approximately made in the shape of a washer. The coating part 18b is made of dielectric such as synthetic resin, and coats the board part 18a and coils 50 to be described. The circuit board 18 is fixed to the shaft support portion 36 by a plurality of screws. The rotation detector 19 is a type of detector with a sealed detection part and is, for instance, a potentiometer, a rotary encoder or so forth. As shown in FIG. 4, the rotation detector 19 includes a case 19a, a shaft member 19b and a sensor part 19c. The shaft member 19b is supported by the case 19a while being rotatable about the first axis X1. The sensor part 19c is mounted to the interior of the case 19a, and is capable of detecting the rotational position of the shaft member 19b. The sensor part 19c includes a variable resistor that resistance varies in accordance with rotation of the shaft member 19b. The sensor part 19c changes an output voltage in accordance with the rotational position of the shaft member 19b.

The rotation detector 19 detects the rotational position of at least one moving member 20. Thus, the rotation detector 19 is an example of a rotation detecting means. In the first preferred embodiment, the number of at least one moving member 20 is one. The moving member 20 is coupled to the tip of the shaft member 19b of the rotation detector 19 while being unitarily rotatable therewith about the first axis X1. As shown in FIGS. 4 and 5, the moving member 20 is a disc-shaped member and includes a protrusion 68a on its surface. The protrusion 68a composes a cam follower 68 of the cooperative actuating mechanism 26.

Figure 3:
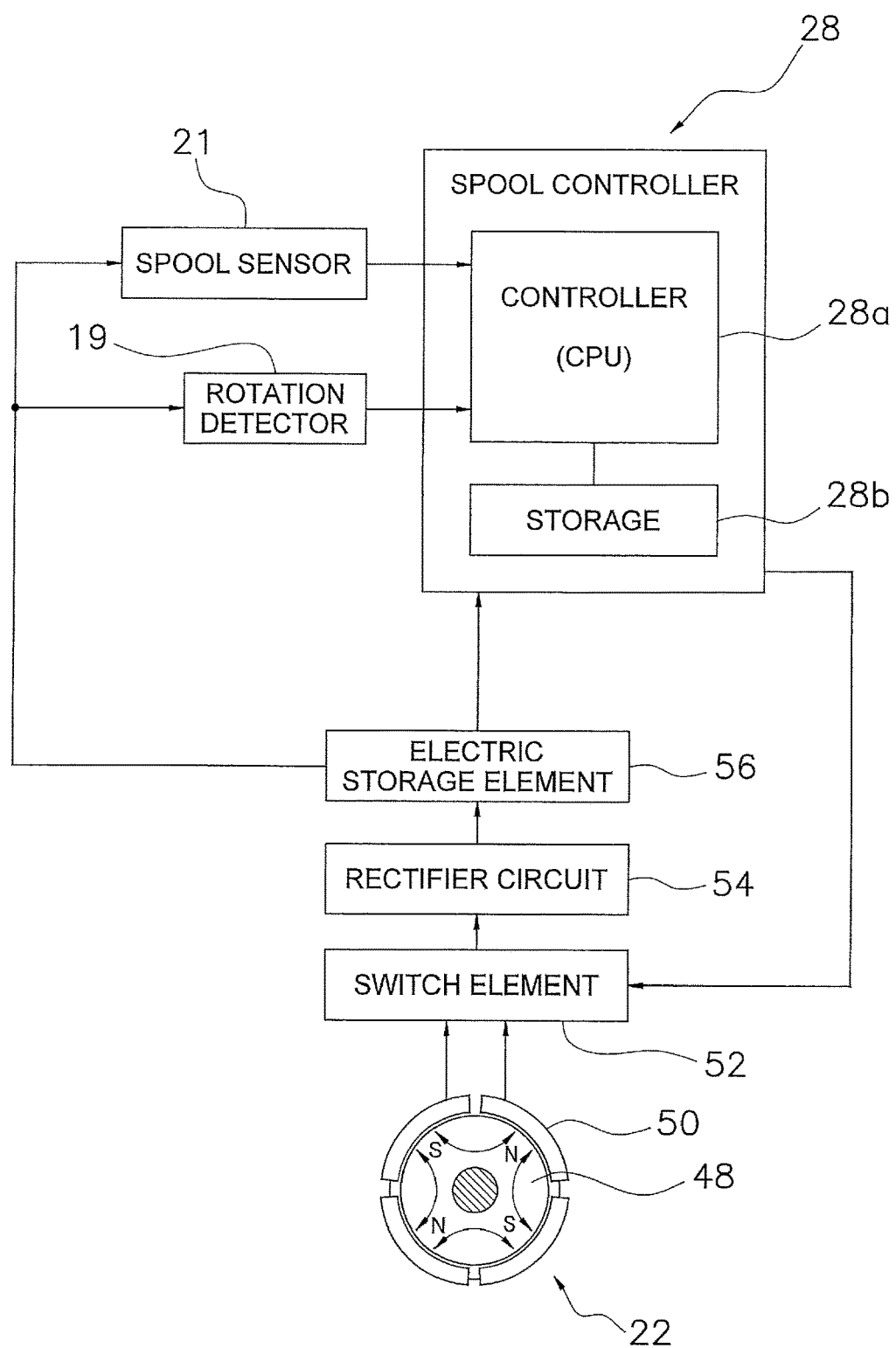
FIG. 3 is a configuration block diagram of a spool controller and a spool brake.

As shown in FIGS. 2 and 3, the spool brake 22 performs a brake action with respect to the spool 16 in an electrically controllable manner, and is capable of adjusting a braking force (exemplary state of action) in response to an operation of the operating member 24 through the moving member 20. The spool brake 22 includes a brake magnet 48 mounted to the spool 16 in a unitarily rotatable state, a plurality of coils 50 connected in series, and a switch element 52 (see FIG. 3). The brake magnet 48 is mounted to the spool shaft 46 in a unitarily rotatable state. In the present preferred embodiment, the brake magnet 48 is fixed to the spool shaft 46 by adhesion. The brake magnet 48 is a cylindrical magnet magnetized to have magnetic anisotropy and has a plurality of magnetic poles. The plural coils 50 are disposed on the outer peripheral side of the brake magnet 48 while being aligned at predetermined intervals in a tubular arrangement. The coils 50 are attached to the circuit board 18 through a coil attaching member (not shown in the drawings). Coreless coils can be employed as the coils 50 for preventing cogging in order to smoothly rotate the spool 16. Moreover, the coils 50 are not provided with any yoke. Wires of the coils 50 are respectively wound in a roughly rectangular shape. The wound wires are opposed to the brake magnet 48 while being disposed within the magnetic field of the brake magnet 48. The both ends of the plural coils 50 connected in series are electrically connected to the switch element 52 mounted to the circuit board 18. In the first preferred embodiment, four coils 50 are provided. Each of the coils 50 has a circular-arc curved shape. The entirety of the plural coils 50 has a roughly tubular shape. The switch element 52 can be implemented by, for instance, a field effect transistor.

The spool brake 22 changes a duty cycle by causing the switch element 52 to switch on and off an electric current generated by a relative rotation between the brake magnet 48 and the coils 50. Accordingly, the spool 16 is braked with the changed duty cycle. The braking force generated by the spool brake 22 is strengthened with an increase in length of a switch-on time by the switch element 52 (i.e., with an increase in a magnitude of a duty cycle). The switch element 52 is connected to an electric storage element 56 through a rectifier circuit 54. The electric storage element 56 stores electric power generated by the coils 50 during a casting. The electric storage element 56 functions as a power source that supplies electric power to the spool controller 28 and at least one electric component connected to the spool controller 28. The electric storage element 56 can be, for instance, an electrolytic capacitor.

Figure 6:
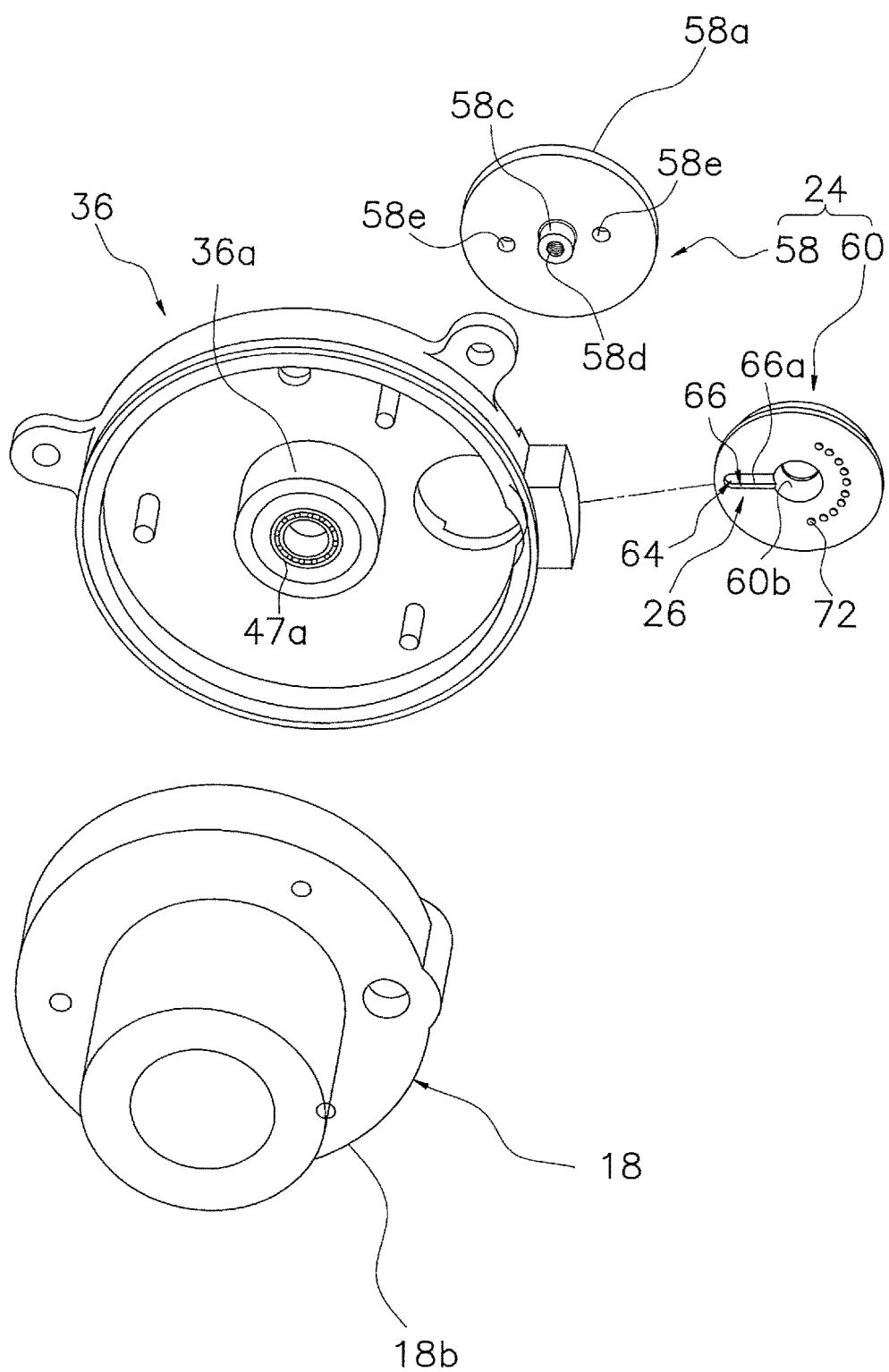
FIG. 6 is an exploded perspective view of the construction of the circuit board and the cooperative actuating mechanism as seen from a spool side.
Figure 7:
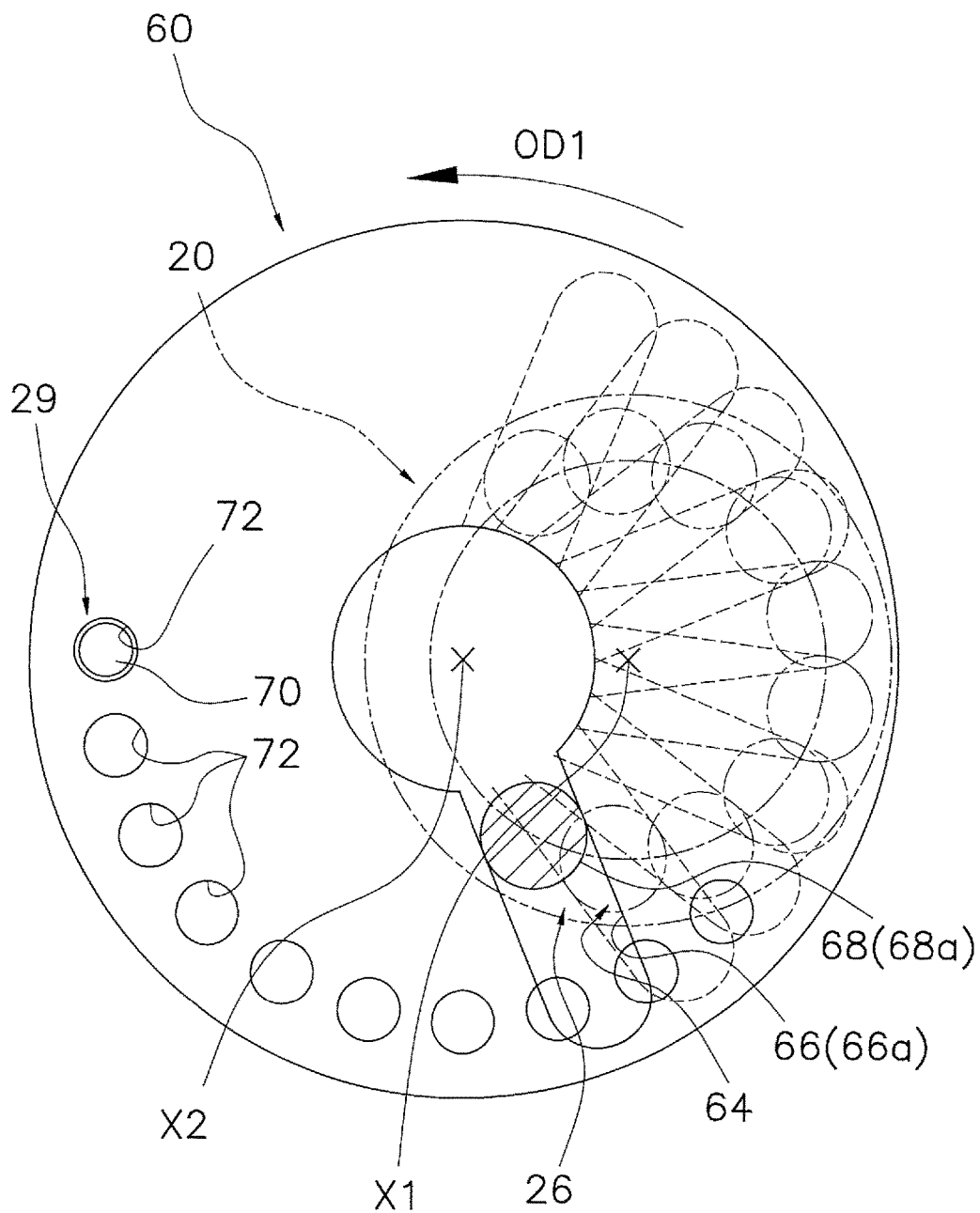
FIG. 7 is a rear view of the operating member and explains that a moving member is rotated in conjunction with rotation of the operating member in the first preferred embodiment.

At least one operating member 24 is movably mounted to the reel unit 12, and performs an operation of adjusting a braking state of the spool brake 22. Thus, the operating member 24 is an example of an adjusting means. The operating member 24 is mounted rotatably about a second axis X2 arranged in parallel to the first axis X1. The operating member 24 is disposed overlapping with the moving member 20 in an axial direction parallel to the first axis X1. In the first preferred embodiment, the operating member 24 is capable of adjusting the magnitude of a braking force to a plurality of levels. As shown in FIG. 7, rotation of the operating member 24 is restricted to an angular range of approximately 140 degrees by a restriction structure (not shown in the drawings). As shown in FIGS. 4, 5 and 6, the operating member 24 includes an operating member body 58 and an annular member 60 coupled to the operating member body 58 in a unitarily rotatable state. The operating member body 58 is supported by the shaft support portion 36 while being rotatable about the second axis X2.

The operating member body 58, together with the annular member 60, is rotatably prevented from being detached from the shaft support portion 36 by a screw member 62. The operating member body 58 includes a body 58a having a disc shape, an operating protrusion 58b, a shaft 58c, a screw hole 58d and at least one first joint 58e. The operating protrusion 58b is disposed on the outer lateral surface of the body 58a along the diameter of the body 58a, and protrudes axially outward. The shaft 58c is provided on the inner lateral surface of the body 58a and has a tubular shape. The shaft 58c is supported by the support hole 36d while being rotatable about the second axis X2. The screw hole 58d is provided in the tip of the shaft 58c. The screw member 62 is screwed into the screw hole 58d. The head of the screw member 62 has a larger diameter than the support hole 36d. At least one first joint 58e is provided on the inner lateral surface of the body 58a in order to rotate the annular member 60 about the second axis X2 in conjunction with rotation of the operating member body 58 about the second axis X2. In the first preferred embodiment, a plurality of (e.g., two) the first joints 58e are provided. Each first joint 58e is made in the form of either a protrusion or a recess. In the first preferred embodiment, each first joint 58e is made in the form of a recess.

The annular member 60 is provided for coupling the operating member body 58 to the cooperative actuating mechanism 26. The annular member 60 includes second joints 60a to be engaged with the first joints 58e. The annular member 60 and the operating member body 58 can be integrally provided. However, assembling work can be easily done by dividing the annular member 60 and the operating member body 58. Additionally, the annular member 60 is provided with a through hole 60b. The through hole 60b is fitted onto the shaft 58c.

The cooperative actuating mechanism 26 rotates the moving member 20 in conjunction with movement of the operating member 24. Thus, the cooperative actuating mechanism 26 is an example of a transmission means. The cooperative actuating mechanism 26 includes a cam mechanism 64. The cam mechanism 64 rotates the moving member 20 about the first axis X1 in conjunction with rotation of the operating member 24 about the second axis X2.

The cam mechanism 64 includes a cam 66 and the cam follower 68. The cam 66 is provided on one of the moving member 20 and the operating member 24. The cam follower 68 is provided on the other of the moving member 20 and the operating member 24, and is engaged with the cam 66. In the first preferred embodiment, the cam 66 is provided on the operating member 24. Specifically, the cam 66 includes a cam groove 66a provided on the inner lateral surface of the annular member 60. The cam groove 66a extends from the inner peripheral surface of the through hole 60b of the annular member 60 along the radial direction. The outer peripheral end of the cam groove 66a is closed. The protrusion 68a, provided as the cam follower 68, is disposed on the moving member 20 parallel to and away from the first axis X1. The protrusion 68a can contact the wall surface of the cam groove 66a, and is engaged with the cam groove 66a.

As shown in FIG. 3, the spool controller 28 includes a controller 28a and a storage 28b. The controller 28a can be a microcomputer including an ROM, an RAM and a CPU. The storage 28b can be a non-volatile memory such as an EEPROM or a flash memory. The spool sensor 21 and the rotation detector 19 are electrically connected to the spool controller 28. The spool sensor 21 is mounted to the circuit board 18.

The spool controller 28 calculates a tension F acting on the fishing line by software or hardware, and controls the spool brake 22 in accordance with the calculated tension F and a brake state selected by the operating member 24.

As shown in FIG. 7, the positioning mechanism 29 is capable of setting the operating member 24 in any of a plurality of moving positions (rotational positions), each moving position corresponding to one of a plurality of levels (e.g., four to ten levels; ten levels in the first preferred embodiment). Thus, the positioning mechanism 29 is an example of a positioning means. The positioning mechanism 29 includes a positioning pin 70, a plurality of recesses 72 and an urging member 74. The positioning pin 70 can be positioned in any of the positioning recesses 72. The urging member 74 urges the positioning pin 70 toward the positioning recesses 72. The positioning pin 70 and the urging member 74 are mounted to the accommodation hole 36e in the shaft support portion 36. The plural positioning recesses 72 are provided on an outer peripheral part of the inner lateral surface of the annular member 60. The plural positioning recesses 72 are located on the opposite side of the cam groove 66a while being aligned at intervals in the circumferential direction. The number of the plural positioning recesses 72 is, for instance, ten. With this construction, the operating member 24 is settable in any of the moving positions corresponding to ten levels. The positioning recesses 72 can be recessed in, for instance, a columnar shape or a spherical shape. In the first preferred embodiment, the positioning recesses 72 are disposed while being recessed in a spherical shape. The positioning pin 70 has a tip rounded in a spherical shape. The positioning pin 70 is disposed in opposition to the positioning recesses 72.

As shown in FIG. 7, in the cooperative actuating mechanism 26 and the positioning mechanism 29 constructed as described above, when the operating member 24 is operated in a first operating direction OD1 (i.e., the counterclockwise direction about the second axis X2) from a position shown in FIG. 7, the cam 66 (the cam groove 66a) of the cooperative actuating mechanism 26 presses the cam follower 68 (the protrusion 68a) and accordingly the moving member 20 is rotated in the counterclockwise direction about the first axis X1. At this time, the operating member 24 is set in any of the ten circumferential positions. Accordingly, the output voltage of the rotation detector 19 varies, and the rotational position of the moving member 20 is detectable. The spool controller 28 adjusts the braking force of the spool brake 22 in accordance with the detected rotational position. Thus, the spool controller 28 is an example of a control means.

The cooperative actuating mechanism 26 is herein mounted between the moving member 20 and rotates about the first axis X1, and the operating member 24 rotates about the second axis X2. With this construction, the positional arrangement of the operating member 24 becomes highly flexible. Therefore, a single type of the circuit board 18 is usable in the dual-bearing reel 10 including the electrically controllable spool brake 22 regardless of the size of the dual-bearing reel 10.

Modification of First Preferred Embodiment

It should be noted that in the following explanation, a constituent element will be denoted by a reference sign assigned to its relevant constituent element in the first preferred embodiment and will not be hereinafter explained when having the same construction as its relevant constituent element. However, a constituent element will be denoted by a three-digit reference sign, the last two digits of which correspond to a reference sign assigned to its relevant constituent element in the first preferred embodiment, and will be hereinafter explained when exerting the same working effect as its relevant constituent element albeit its difference in construction from the relevant constituent element.

Figure 8:
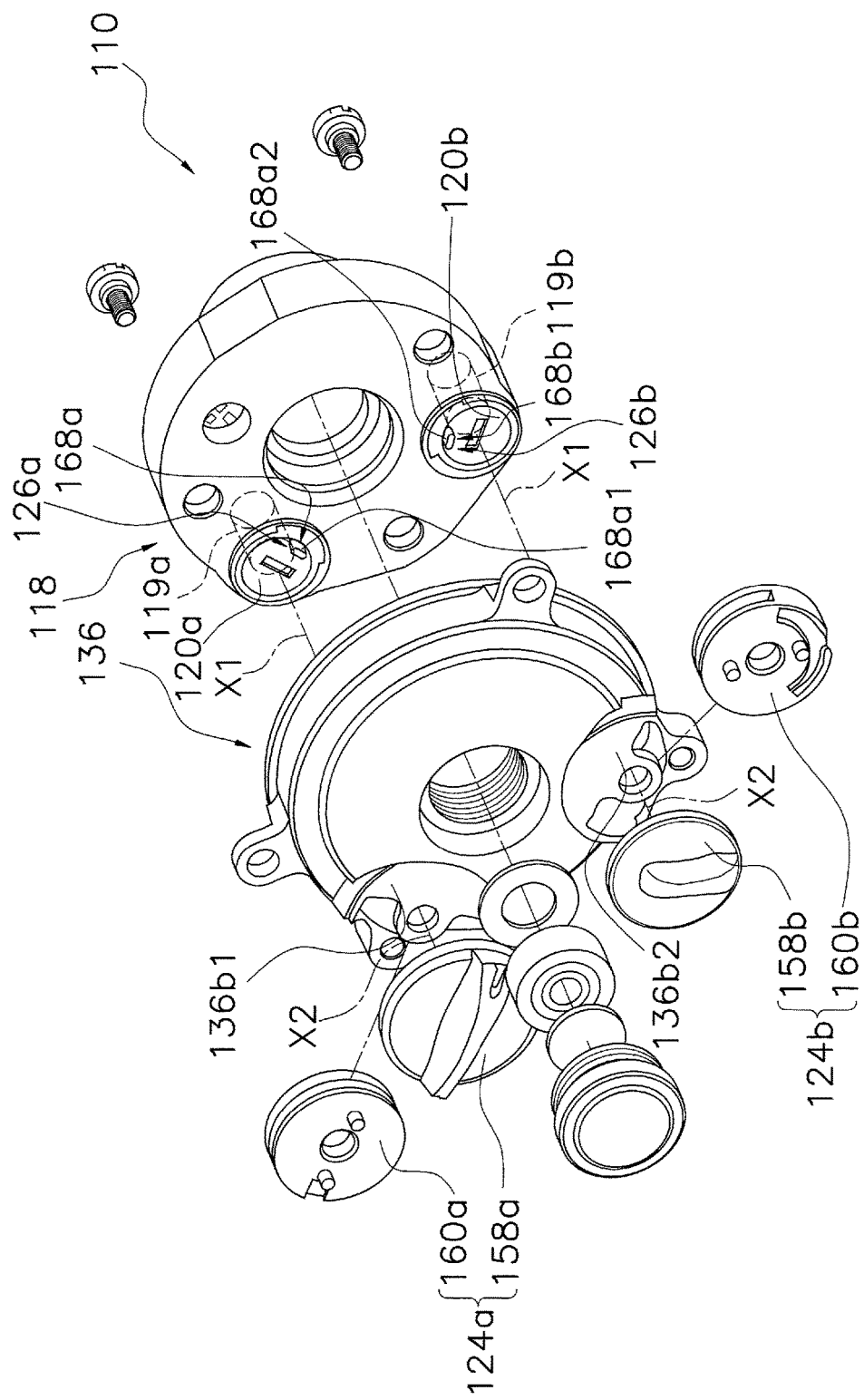
FIG. 8 is an exploded perspective view in a modification of the first preferred embodiment.

In the first preferred embodiment, a single operating member 24 is provided. By contrast, a dual-bearing reel 110 according to a modification shown in FIG. 8 is provided with a first operating member 124a and a second operating member 124*b*. The first operating member 124*a* includes a first operating member body 158*a* and a first annular member 160*a*. The second operating member 124*b* includes a second operating member body 158*b* and a second annular member 160*b*. The first operating member 124*a* is herein provided for selecting any one of a plurality of (e.g., four) brake modes. Depending on the brake modes, the braking force varies with time in different patterns. In the modification of the first preferred embodiment, for instance, one of four brake modes is selectable. The four brake modes include an automatic brake mode and three brake modes corresponding to types of fishing line (e.g., nylon line, fluorocarbon line (polyvinylidene fluoride line), and PE line (polyethylene fiber thread)). On the other hand, the second operating member 124*b* is provided for selecting any of a plurality of levels of magnitude of a braking force. In the modification of the first preferred embodiment, the magnitude of a braking force is adjustable in, for instance, eight levels. The first operating member 124*a* and the second operating member 124*b* are examples of an adjusting means.

A circuit board 118 includes a first rotation detector 119*a* and a second rotation detector 119*b*. The first rotation detector 119*a* and the second rotation detector 119*b* are also examples of a rotation detecting means. A first moving member 120*a* is coupled to the first rotation detector 119*a* while being unitarily rotatable therewith. A second moving member 120*b* is coupled to the second rotation detector 119*b* while being unitarily rotatable therewith. Additionally, a shaft support portion 136 includes a first cooperative actuating mechanism mount part 136*b*1 and a second cooperative actuating mechanism mount part 136*b*2. The first cooperative actuating mechanism mount part 136*b*1 is a part to which a first cooperative actuating mechanism 126*a* is mounted. The second cooperative actuating mechanism mount part 136*b*2 is a part to which a second cooperative actuating mechanism 126*b* is mounted. The first cooperative actuating mechanism 126*a* and the second cooperative actuating mechanism 126*b* are also examples of a transmission means.

Figure 9:
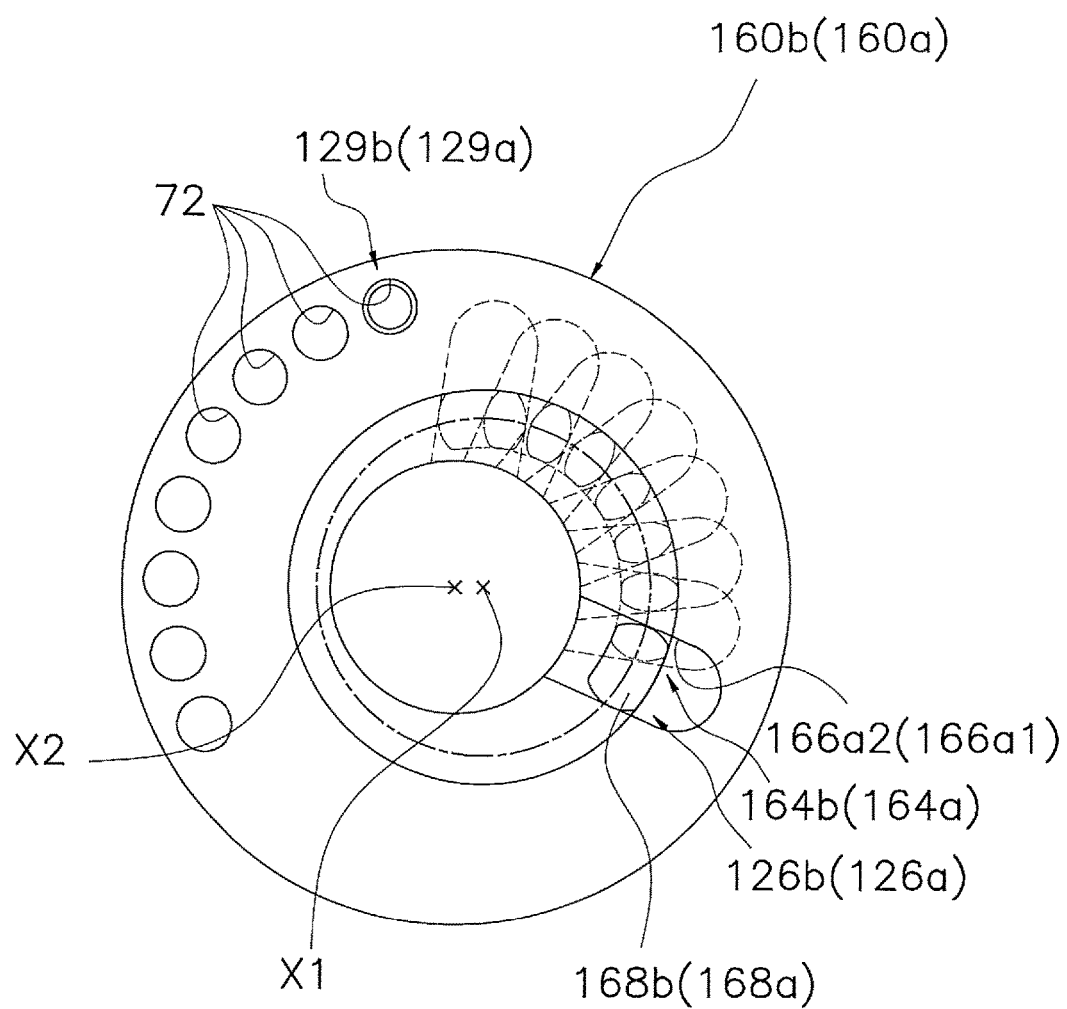
FIG. 9 is a view of a first operating member and a second operating member in the modification and corresponds to FIG. 5.

As shown in FIGS. 8 and 9, the first cooperative actuating mechanism 126*a* includes a first cam mechanism 164*a*. The first cam mechanism 164*a* includes a first cam follower 168*a* and a first cam 166*a*. The first cam follower 168*a* is provided on the first moving member 120*a*. The first cam 166*a* is provided on the first annular member 160*a*. The first cam 166*a* is provided with a first cam groove 166*a*1 on the inner lateral surface of the first annular member 160*a*. The first cam groove 166*a*1 extends along the radial direction of the first annular member 160*a*. The first cam follower 168*a* includes a first protrusion 168*a*1 provided on the first moving member 120*a*. It should be noted that FIG. 9 shows the second cooperative actuating mechanism 126*b* in which a large number of positions are provided for a positioning purpose.

The second cooperative actuating mechanism 126*b* includes a second cam mechanism 164*b*. The second cam mechanism 164*b* includes a second cam follower 168*b* and a second cam 166*b*. The second cam follower 168*b* is provided on the second moving member 120*b*. The second cam 166*b* is provided on the second annular member 160*b*. The second cam 166*b* is provided with a second cam groove 166*a*2 on the inner lateral surface of the second annular member 160*b*. The second cam groove 166*a*2 extends along the radial direction of the second annular member 160*b*. The second cam follower 168*b* includes a second protrusion 168*a*2 provided on the second moving member 120*b*.

The dual-bearing reel 110 is further provided with a first positioning mechanism 129*a* and a second positioning mechanism 129*b*. The first positioning mechanism 129*a* sets the first operating member 124*a* in, for instance, any one of four circumferential positions. The second positioning mechanism 129*b* sets the second operating member 124*b* in, for instance, any one of eight circumferential positions. The other constituent elements of the dual-bearing reel 110 are similar to those in the first preferred embodiment, and hence, will not be hereinafter explained.

The dual-bearing reel 110 constructed as described above is provided with the first operating member 124*a* and the second operating member 124*b*. Hence, braking force is further minutely adjustable.

Second Preferred Embodiment

Figure 10:
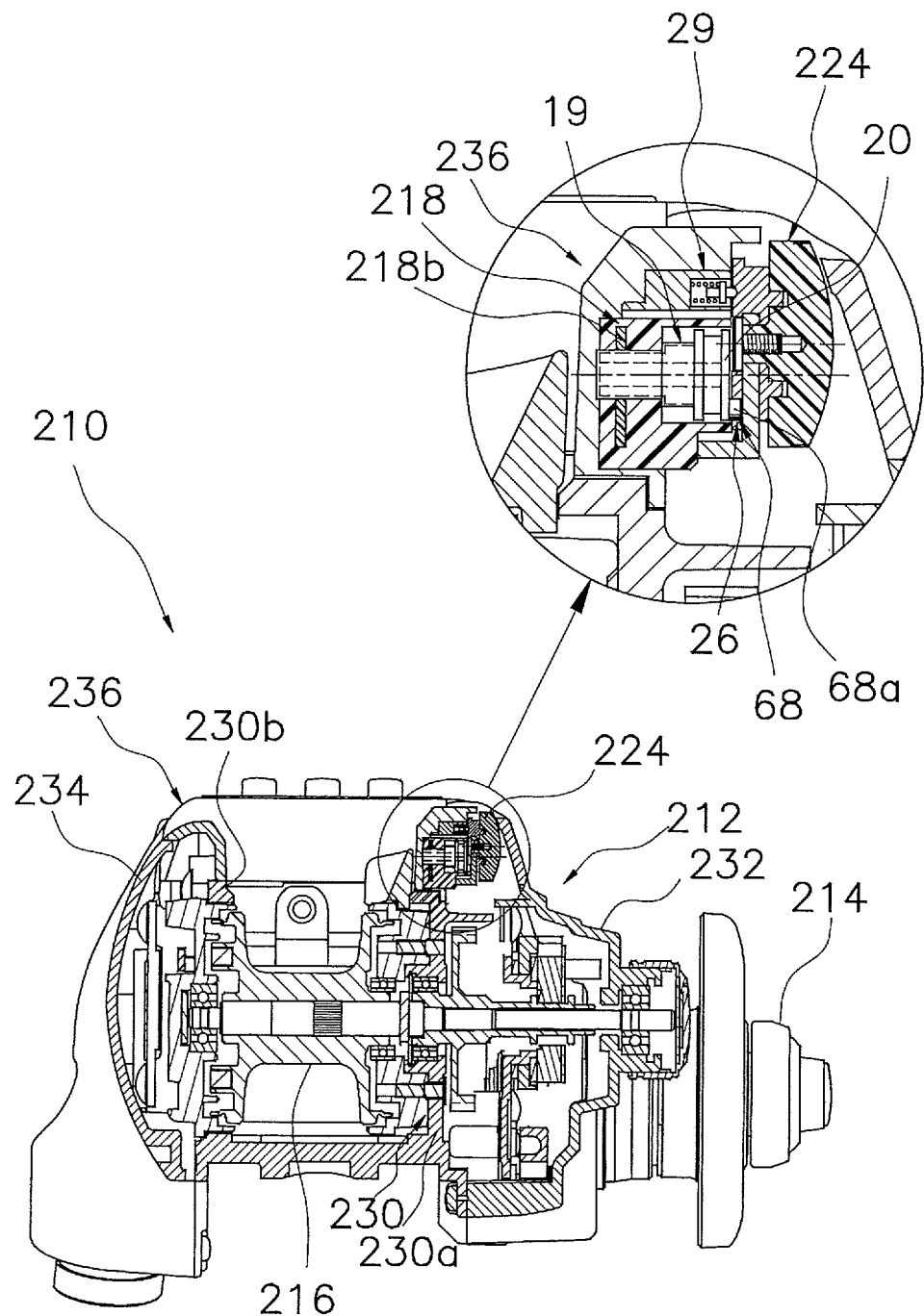
FIG. 10 is a cross-sectional rear view of an electric dual-bearing reel according to a second preferred embodiment of the present disclosure.
Figure 11:
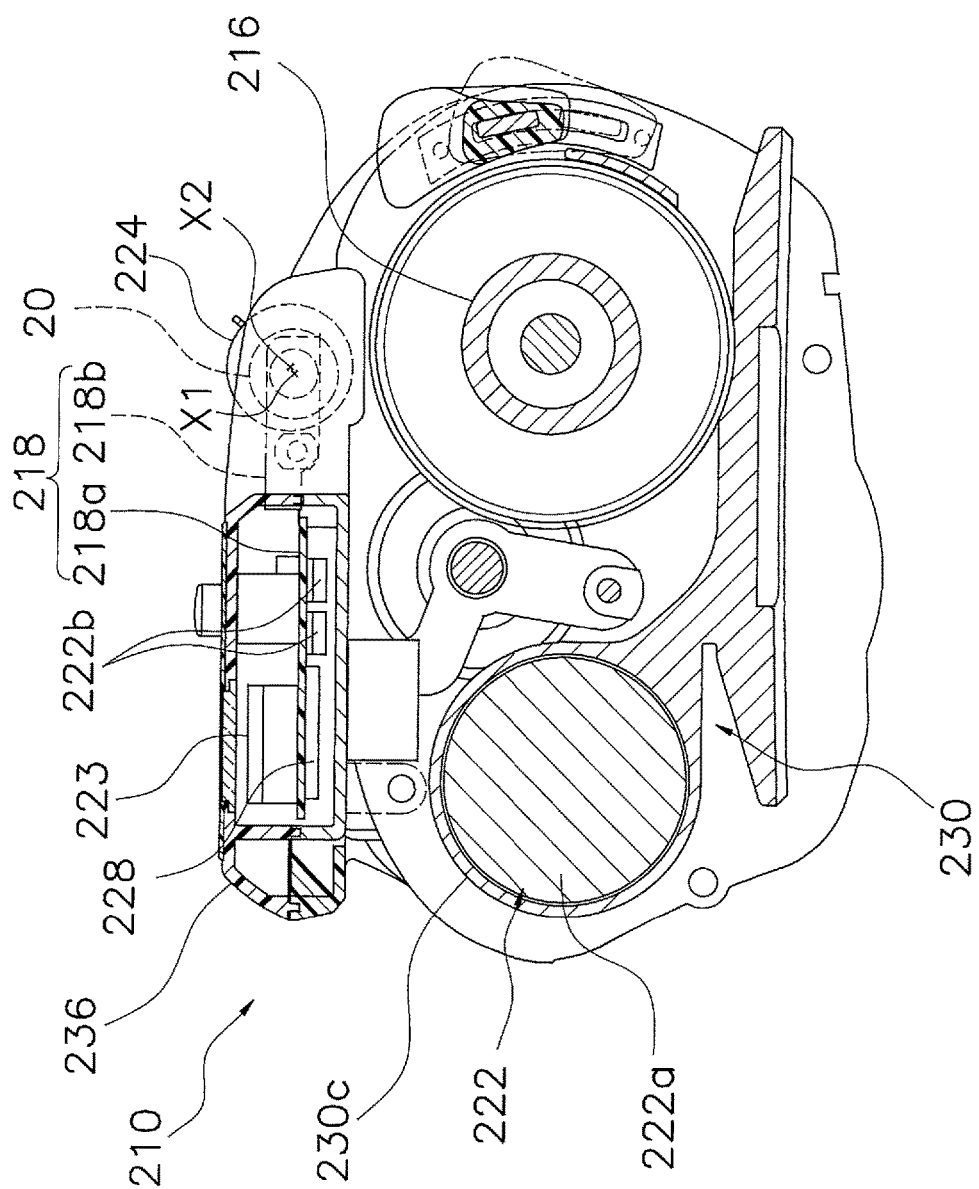
FIG. 11 is a cross-sectional side view of the electric dual-bearing reel according to the second preferred embodiment.

In a second preferred embodiment, a dual-bearing reel 210 will be explained. As shown in FIGS. 10 and 11, the dual-bearing reel 210 includes a spool driver 222 provided as a spool actuating mechanism (spool actuator).

The dual-bearing reel 210 includes a reel unit 212, a handle 214, a spool 216 for winding a fishing line, a circuit board 218 including the rotation detector 19, at least one moving member 20 (see FIG. 10), the spool driver 222 (see FIG. 12) including a motor 222*a*, an operating member 224, the cooperative actuating mechanism 26, a spool controller 228 (see FIG. 12) and the positioning mechanism 29. Therefore, the dual-bearing reel 210 according to the second preferred embodiment includes the rotation detector 19, the moving member 20, the cooperative actuating mechanism 26 and the positioning mechanism 29, which are substantially the same as their relevant constituent elements in the first preferred embodiment. The operating member 224 is provided for adjusting the rotational state of the motor 222*a*. Thus, the operating member 224 is another example of an adjusting means. The operating member 224 is different from the operating member 24 in the first preferred embodiment in that not its outer lateral surface but its outer peripheral surface is operated. The operating member 224 is provided for adjusting the rotational velocity of the spool 216 in a plurality of levels.

The reel unit 212 includes a frame 230, a first side cover 232, a second side cover 234 and a counter case 236. The frame 230 includes a first side plate 230*a* and a second side plate 230*b* that are opposed at an interval. The first side cover 232 covers the outer lateral surface of the first side plate 230*a* on the handle 214 side. The second side cover 234 covers the outside of the second side plate 230*b*. The counter case 236 is disposed atop the frame 230. The counter case 236 includes a display 223. The display 223 can be, for instance, a liquid crystal display and displays the water depth of a terminal tackle attached to an end of the fishing line. The counter case 236 accommodates the circuit board 218. The circuit board 218 is composed of a first circuit board 218*a* and a second circuit board 218*b*. The first circuit board 218*a* is a member to which the display 223 and the spool controller 228 are mounted. The second circuit board 218*b* includes the rotation detector 19 and is electrically connected to the first circuit board 218*a*. The second circuit board 218*b* is mounted to the rear part of the counter case 236 on the handle 214 side. The frame 230 includes a motor container 230*c*. The motor container 230*c* has a tubular shape and couples the first side plate 230*a* and the second side plate 230*b* in a position located forward of the spool 216.

The motor 222a is accommodated in and fixed to the motor container 230c. On the handle 214 side, the motor 222a is driven to rotate the spool 216 in a fishing line winding direction through a rotation transmission mechanism (not shown in the drawings).

Figure 12:
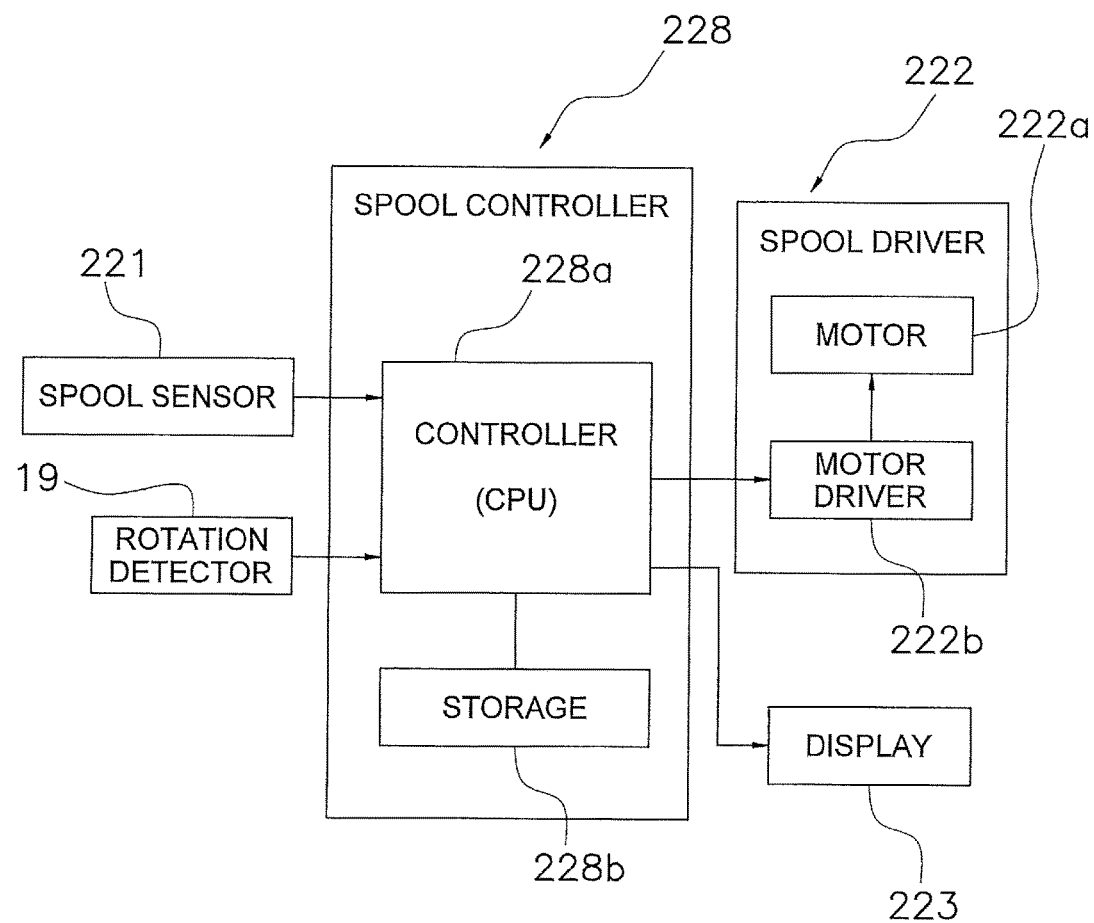
FIG. 12 is a configuration block diagram of a spool controller and a spool brake according to the second preferred embodiment.

As shown in FIG. 12, the spool driver 222 includes the motor 222a accommodated in the motor container 230c and a motor driver 222b drives the motor 222a with pulse width modulation. The motor driver 222b is composed of a plurality of field effect transistors accommodated in the counter case 236.

As shown in FIG. 12, the spool controller 228 includes a controller 228a and a storage 228b. The controller 228a can be a microcomputer including an ROM, an RAM and a CPU. The storage 228b can be a non-volatile memory such as an EEPROM or a flash memory. A spool sensor 221 and the rotation detector 19 are electrically connected to the spool controller 228. The spool sensor 221 is used for detecting the rotational velocity of the spool 216, the total number of rotations of the spool 216, and so forth. The rotation detector 19 detects the rotational position of the moving member 20.

The spool controller 228 controls the motor 222a with pulse width modulation by software through the motor driver 222b in accordance with the moving position of the moving member 20 detected by the rotation detector 19. Additionally, the spool controller 228 also performs a display control for the display 223 mounted to the counter case 236.

In the dual-bearing reel 210 of an electric type constructed as described above, when the operating member 224 is operated in the first operating direction OD1 that is the counterclockwise direction about the second axis X2, the cam 66 (the cam groove 66a) of the cooperative actuating mechanism 26 presses the cam follower 68 (the protrusion 68a), whereby the moving member 20 is rotated in the counterclockwise direction about the first axis X1. At this time, the operating member 224 is set in any one of a plurality of (e.g., ten) circumferential positions. Accordingly, the output voltage of the rotation detector 19 varies, and the rotational position of the moving member 20 is detectable.

<Features>

The aforementioned preferred embodiment can be expressed as follows.

(A) The dual-bearing reel 10 forwardly releases the fishing line. The dual-bearing reel 10 includes the reel unit 12, the spool 16 for winding the fishing line, the circuit board 18, at least one moving member 20, the spool brake 22, at least one operating member 24, the cooperative actuating mechanism 26 and the spool controller 28. The spool 16 for winding the fishing line is rotatably mounted to the reel unit 12. The circuit board 18 includes at least one rotation detector 19. The at least one rotation detector 19 is capable of detecting a rotational position about the first axis X1. The at least one moving member 20 is a member that the rotational position thereof is detected by the at least one rotation detector 19. The spool brake 22 performs an action with respect to the spool 16 in an electrically controllable manner, and a state of the action is adjustable by the at least one moving member 20. Thus, the spool brake 22 is an example of an actuating means. The at least one operating member 24 is movably mounted to the reel unit 12, and performs an operation of adjusting the state of the action of the spool brake 22. The cooperative actuating mechanism 26 rotates the at least one moving member 20 in accordance with a movement of the at least one operating member 24. The spool controller 28 controls the spool brake 22 in accordance with the rotational position of the at least one moving member 20.

In the dual-bearing reel 10, when the at least one operating member 24 is operated and moved, the cooperative actuating mechanism 26 rotates the at least one moving member 20 about the first axis X1 in conjunction with the at least one operating member 24. When the at least one moving member 20 is rotated, the at least one rotation detector 19 detects the rotational position of the at least one moving member 20. Then, the spool controller 28 controls the spool brake 22 in accordance with the rotational position of the at least one moving member 20. Here, the at least one moving member 20, the rotational position of which is detected by the at least one rotation detector 19, is indirectly coupled to the at least one operating member 24 through the cooperative actuating mechanism 26 without being directly coupled to the at least one operating member 24. Hence, the at least one moving member 20, the at least one rotation detector 19 and the circuit board 18 are commonly usable among a plurality of dual-bearing reels having different sizes. In other words, a single type of circuit board is usable for the dual-bearing reel 10 regardless of the size of the dual-bearing reel 10.

(B) The at least one operating member 24 can rotate about the second axis X2 arranged in parallel to the first axis X1 while mounted to the reel unit 12. According to this construction, the at least one operating member 24 is also rotated. Hence, the cooperative actuating mechanism 26 can be simply constructed.

(C) The cooperative actuating mechanism 26 can include the cam mechanism 64. The cam mechanism 64 rotates the at least one moving member 20 in conjunction with the movement of the at least one operating member 24. According to this construction, the cooperative actuating mechanism 26 can be implemented by the cam mechanism 64 composed of the cam 66 and the cam follower 68. Hence, the cooperative actuating mechanism 26 can be more simply constructed.

(D) The at least one moving member 20 can be disposed to overlap with the at least one operating member 24 in an axial direction. According to this construction, the at least one moving member 20 and the at least one operating member 24 are disposed overlapping with each other in the axial direction. Hence, the dual-bearing reel 10 can be constructed in a compact size in the radial direction.

(E) The spool brake 22 brakes the spool 16, and includes the coil 50 and the brake magnet 48. The coil 50 is mounted to the circuit board 18. The brake magnet 48 is mounted to the spool 16 in a unitarily rotatable state. The at least one moving member 20 can be mounted to the circuit board 18 so as to be rotatable about the first axis X1. The at least one operating member 24 can be mounted to the reel unit 12 so as to be rotatable about the second axis X2. According to this construction, the circuit board 18 is usable as a single type of circuit board for the spool brake 22 brakes the spool 16 by controlling electric current flowing through the coil 50 regardless of the size of dual-bearing reel 10.

(F) The spool driver 222 can include the motor 222a fixed to the reel unit 212, and can drive the motor 222a to rotate the spool 16. The at least one operating member 224 can rotate about the second axis X2 while mounted to the reel unit 212. According to this construction, the circuit board 218 is usable as a single type of circuit board for the spool driver 222 drives the motor 222a to rotate the spool 216 regardless of the size of dual-bearing reel 210. Thus, the spool driver is another example of an actuating means.

(G) The cam mechanism 64 can include the cam 66 and the cam follower 68. The cam 66 is mounted to one of the at least one moving member 20 and the at least one operating member 24. The cam follower 68 is mounted to the other of the at least one moving member 20 and the at least one operating member 24, and is engaged with the cam 66. According to this construction, the cooperative actuating mechanism 26 can be simply constructed by the cam mechanism 64.

(H) The cam 66 can include the cam groove 66a provided on the at least one operating member 24 in a radial direction. The cam follower 68 can include the protrusion 68a. The protrusion 68a is disposed on the at least one moving member 20 parallel to and away from the first axis X1. The protrusion 68a can contact a wall surface of the cam groove 66a. According to this construction, rotation of the at least one operating member 24 about the second axis X2 can be easily transmitted to rotation of the at least one moving member 20 about the first axis X1 by the engagement of the protrusion 68a with the cam groove 66a.

(I) The dual-bearing reel 10 can further include the positioning mechanism 29. The positioning mechanism 29 can set the at least one operating member 24 in any of moving positions corresponding to a plurality of levels. According to this construction, the at least one operating member 24 is set in any of the moving positions corresponding to the levels. Therefore, the state of the action of the spool brake 22 can be easily reproduced.

Other Exemplary Embodiments

Preferred embodiments of the present disclosure have been explained above. However, the present disclosure is not limited to the above, and a variety of changes can be made without departing from the scope of the present disclosure. Especially, a plurality of embodiments and modifications described in the present specification can be arbitrarily combined on an as-needed basis.

(a) In the first preferred embodiment, the sensor part 19c can be a variable transistor as a potentiometer. However, in the present disclosure, the sensor part 19c is not limited to this. The sensor part can be composed of a hall element and a magnet. In this construction, the case 19a can be composed of a magnetic flux shield member so as not to be affected by the magnetic field generated by the brake magnet 48. Additionally, a digital potentiometer or a rotary encoder can be used as the sensor part.

(b) In the second preferred embodiment, the spool driver 222 drives the motor 222a to rotate the spool 216, and is disclosed as a spool actuating mechanism. However, in an alternative to the second preferred embodiment, a drag mechanism using a motor can be employed as a spool actuating mechanism.

(c) In the first preferred embodiment, the cooperative actuating mechanism 26 is composed of the cam mechanism 64. However, the cooperative actuating mechanism 26 is not limited to the cam mechanism 64. For example, the cooperative actuating mechanism can be implemented by coupling the moving member and the operating member by a link mechanism.

(d) The first preferred embodiment (or its modification) has explained the cam mechanism 64 (or 164a and 164b) of the cooperative actuating mechanism 26 (or 126), in which the cam 66 (or 166a and 166b) is provided on the operating member 24 (or 124a and 124b) whereas the cam follower 68 (or 168a and 168b) is provided on the moving member 20 (or 120a and 120b). However, the positions of the cam 66 (or 166a and 166b) and the cam follower 68 (or 168a and 168b) can be reversed.

(e) In the first preferred embodiment, the operating member 24 is rotatable. However, in the present disclosure, the motion of the operating member 24 is not limited to rotation. The motion of the operating member 24 can be pivot or slide.

What is claimed is:

1. A dual-bearing reel configured to forwardly release a fishing line, the dual-bearing reel comprising:
   a reel unit;
   a spool for winding the fishing line, the spool rotatably mounted to the reel unit;
   a first moving member rotatable about a first axis;
   a first rotation detector configured to detect a first rotational position of the first moving member about the first axis;
   a spool actuator electrically controllable and configured to perform an action with respect to the spool;
   a first operating member movably mounted to the reel unit, the first operating member configured to adjust a first state of the spool actuator;
   a first cooperative actuating mechanism configured to rotate the first moving member in accordance with a movement of the first operating member; and
   a spool controller configured to control the spool actuator based on the first rotational position.

2. The dual-bearing reel according to claim 1, wherein the first operating member is rotatable about a second axis parallel to the first axis, the first operating member mounted to the reel unit.

3. The dual-bearing reel according to claim 2, wherein the first cooperative actuating mechanism includes a cam mechanism, the cam mechanism configured to rotate the first moving member in conjunction with a movement of the first operating member.

4. The dual-bearing reel according to claim 2, wherein the first moving member is disposed overlapping with the first operating member in a direction parallel to the first axis.

5. The dual-bearing reel according to claim 2, wherein
   the spool actuator is a spool brake, the spool brake configured to brake the spool, the spool brake including a coil and a magnet, the coil mounted to a circuit board, the magnet mounted to the spool and unitarily rotatable with the spool,
   the first rotation detector includes a case, a shaft member, and a sensor, the shaft member supported rotatably about the first axis by the case, the sensor mounted to an interior of the case, the sensor configured to detect the first rotational position of the shaft member, and
   the first moving member is mounted to the shaft member and is unitarily rotatable with the shaft member about the first axis.

6. The dual-bearing reel according to claim 2, wherein
   the spool actuator is a spool driver, the spool driver including a motor fixed to the reel unit, the spool driver configured to drive the motor and to rotate the spool, and
   the first operating member is rotatable about the second axis, the first operating member mounted to the reel unit.

7. The dual-bearing reel according to claim 3, wherein the cam mechanism includes
   a cam mounted to one of the first moving member and the first operating member, and a cam follower mounted to the other of the first moving member and the first operating member, the cam follower engaged with the cam.

8. The dual-bearing reel according to claim 7, wherein
the cam includes a cam groove provided on the first operating member in a radial direction from an axis of rotation of the first operating member, and
the cam follower includes a protrusion, the protrusion disposed on the first moving member and parallel to and away from the first axis, the protrusion contacting a wall surface of the cam groove.

9. The dual-bearing reel according to claim 1, further comprising:
a positioning mechanism configured to set the first operating member in one of a plurality of moving positions, each moving position corresponding to a level.

10. The dual-bearing reel according to claim 1, further comprising:
a second moving member rotatable about a second axis;
a second operating member movably mounted to the reel unit, the second operating member configured to adjust a second state of the spool actuator;
a second cooperative actuating mechanism configured to rotate the second moving member in accordance with a movement of the second operating member; and
a second rotation detector configured to detect a second rotational position of the second moving member about the second axis,
the spool controller further configured to control the spool actuator further based on the second rotational position.

11. A dual-bearing reel comprising:
a spool rotatable about a spool axis;
a first moving member rotatable about a first axis;
a first rotation detector configured to detect a first rotational position of the first moving member about the first axis;
a spool actuator electrically controllable and configured to perform an action with respect to the spool;
a first operating member movably mounted to a reel unit, the first operating member configured to adjust a state of the action of the spool actuator;
a first cooperative actuating mechanism configured to rotate the first moving member in accordance with a movement of the first operating member, the first cooperative actuating mechanism including a first cam mounted to one of the first moving member and the first operating member, and a first cam follower mounted to the other of the first moving member and the first operating member, the first cam follower engaged with the first cam; and
a spool controller configured to control the spool actuator based on the first rotational position.

12. The dual-bearing reel according to claim 11, wherein the first operating member is rotatable about a second axis parallel to the first axis.

13. The dual-bearing reel according to claim 12, wherein
the spool actuator is a spool brake, the spool brake configured to brake the spool, the spool brake including a coil and a magnet, the coil mounted to a circuit board, the magnet mounted to the spool and unitarily rotatable with the spool,
the first rotation detector includes a case, a shaft member, and a sensor, the shaft member supported rotatably about the first axis by the case, the sensor mounted to an interior of the case, the sensor configured to detect the first rotational position of the shaft member, and
the first moving member is mounted to the shaft member and is unitarily rotatable with the shaft member about the first axis.

14. The dual-bearing reel according to claim 12, wherein
the spool actuator is a spool driver, the spool driver including a motor, the spool driver configured to drive the motor and to rotate the spool, and
the first operating member is rotatable about the second axis.

15. The dual-bearing reel according to claim 11, wherein
the first cam includes a cam groove provided on the first operating member in a radial direction from an axis of rotation of the first operating member, and
the first cam follower includes a protrusion, the protrusion disposed on the first moving member and parallel to the first axis, the protrusion contacting a wall surface of the cam groove.

16. The dual-bearing reel according to claim 11, further comprising:
a second moving member rotatable about a second axis;
a second operating member movably mounted to the reel unit, the second operating member configured to adjust a second state of the spool actuator;
a second cooperative actuating mechanism configured to rotate the second moving member in accordance with a movement of the second operating member, the second cooperative actuating mechanism including a second cam mounted to one of the second moving member and the second operating member, and a second cam follower mounted to the other of the second moving member and the second operating member, the second cam follower engaged with the second cam; and
a second rotation detector configured to detect a second rotational position of the second moving member about the second axis,
the spool controller further configured to control the spool actuator based on the second rotational position.

17. A dual-bearing reel comprising:
a reel unit;
a spool for winding a fishing line, the spool rotatably mounted to the reel unit;
a first moving member rotatable about a first axis;
first rotation detecting means for detecting a first rotational position of the first moving member about the first axis;
actuating means for causing an action on the spool;
first adjusting means for adjusting the action on the spool by the actuating means;
first transmission means for transmitting a first operation to the first moving member; and
control means for controlling the actuating means based on the first rotational position, the control means electrically connected to the actuating means and the first rotation detecting means.

18. The dual-bearing reel according to claim 17, further comprising:
positioning means for setting the first adjusting means in one of a plurality of levels.

19. The dual-bearing reel according to claim 17, further comprising:
a second moving member rotatable about a second axis;
second rotation detecting means for detecting a second rotational position of the second moving member about the second axis;
second adjusting means for adjusting the action of the actuating means; and second transmission means for transmitting a second operation to the second moving member, wherein the control means controls the actuating means further based on the second rotational position.

* * * * *